(12) United States Patent
White et al.

(10) Patent No.: US 12,353,062 B2
(45) Date of Patent: Jul. 8, 2025

(54) MAGNETIC COUPLING FOR EYEWEAR

(71) Applicants: Solomon White, Collingdale, PA (US); Paul Danowski, Marlton, NJ (US)

(72) Inventors: Solomon White, Collingdale, PA (US); Paul Danowski, Marlton, NJ (US)

( * ) Notice: Subject to any disclaimer, the term of this patent is extended or adjusted under 35 U.S.C. 154(b) by 383 days.

(21) Appl. No.: 17/468,394

(22) Filed: Sep. 7, 2021

(65) Prior Publication Data

US 2022/0075207 A1 Mar. 10, 2022

Related U.S. Application Data

(60) Provisional application No. 63/075,445, filed on Sep. 8, 2020.

(51) Int. Cl.
*G02C 5/22* (2006.01)
*G02C 5/20* (2006.01)

(52) U.S. Cl.
CPC ............ *G02C 5/2209* (2013.01); *G02C 5/20* (2013.01); *G02C 2200/02* (2013.01); *G02C 2200/08* (2013.01)

(58) Field of Classification Search
CPC .... G02C 5/2209; G02C 5/20; G02C 2200/02; G02C 2200/08
See application file for complete search history.

(56) References Cited

U.S. PATENT DOCUMENTS

| | | | | |
|---|---|---|---|---|
| 3,264,678 A | * | 8/1966 | Parmelee | G02C 5/2209 411/548 |
| 5,642,177 A | * | 6/1997 | Nishioka | G02C 9/00 351/44 |
| 6,217,170 B1 | * | 4/2001 | Hsiao | G02C 5/22 351/140 |
| 2005/0001977 A1 | * | 1/2005 | Zelman | G02C 1/06 351/57 |
| 2014/0104562 A1 | | 4/2014 | Kim | |

FOREIGN PATENT DOCUMENTS

| | | | |
|---|---|---|---|
| CN | 204422889 U | 6/2015 | |
| CN | 209028348 U | 6/2019 | |
| DE | 202011101672 U1 | 9/2011 | |
| FR | 2885230 A1 * | 11/2006 | ............ G02C 5/22 |
| FR | 3056307 A1 * | 3/2018 | ............ G02C 13/00 |
| JP | H07287200 A * | 10/1995 | |
| JP | 2000147437 A * | 5/2000 | ............ G02C 5/00 |
| KR | 200380240 Y1 | 3/2005 | |
| KR | 101819904 B1 | 1/2018 | |
| WO | 2016092204 A1 | 6/2016 | |

OTHER PUBLICATIONS

"Magnetic Eyeglasses Temples," Providence Optical, Retrieved from the Internet URL https://providenceoptical.net/tag/magnetic-eyeglasses-temples, pp. 1-3 (2015).

"Magne-hinge," NENDO, Retrieved from the Internet URL www.nendo.jp/en/works/magne-hinge-2/, pp. 1-7 (2014).

* cited by examiner

*Primary Examiner* — Joseph P Martinez
*Assistant Examiner* — Ray Alexander Dean
(74) *Attorney, Agent, or Firm* — Hamilton, Brook, Smith & Reynolds, P.C.

(57) ABSTRACT

A system is provided for coupling a frame to an arm of an eyewear using magnetic attraction. The system can contain a first and a second series of magnets that couple in a vertical direction or a horizontal direction.

10 Claims, 8 Drawing Sheets

MAGNETIC COUPLING FOR EYEWEAR

RELATED APPLICATION

This application claims the benefit of U.S. Provisional Application No. 63/075,445, filed on Sep. 8, 2020. The entire teachings of the above application are incorporated herein by reference.

BACKGROUND

Eyeglasses are a device worn over human eyes and serve a variety of purposes. Those purposes include vision correction and protection from debris and during medical or dental procedures. Conventional methods of coupling an eyeglass arm to the eyeglass frame, for the most part, utilize a set of small screws inserted into small holes. Over time, these screws tend to loosen, which typically occurs due to frequent movement of the temple or inadvertent hyperextension by the user.

Conventional methods of coupling an eyeglass arm to the eyeglass frame also require specialized equipment needed for repairs and alterations. Those methods are expensive and usually require the skill of a specialist. If the arm or frame of an eyeglass breaks, replacement glasses come at a high cost. Therefore, there is an ongoing need for improved couplings for eyewear.

SUMMARY

An embodiment according to the invention provides magnetic coupling for eyewear that can function like a traditional mechanical eyewear hinge while also allowing the hinge to be easily de-coupled by separating magnetic pole pieces, thereby allowing frames and arms to be easily changed out and replaced. The magnetic coupling operates like a traditional eyewear hinge, with the added benefits of a magnetic connection. Using magnetic attraction and repulsion, magnetic style hinges can, for example, be used in prescription glasses, reading glasses, sports eyewear, medical and dental protective eyewear, and eyewear used in aviation. No screws or small parts are required, making lost or broken parts easily replaceable at low cost. Small parts, such as screws, will not be broken or lost during repairs due to this design. Styles can also be changed to suit the user's needs by simply changing out the eyewear arms with new ones. There also can be the benefit of allowing a user to connect the arm to the frame of eyewear more easily, as the direction of magnetic attraction can be in the same direction that the user brings the arm to the frame.

An embodiment provides a magnetic coupling system for eyewear, the system comprising a frame of the eyewear, an arm of the eyewear, and a hinge coupling the frame to the arm. The hinge comprises (i) a magnetic bearing compartment comprising an opening, and a first pair of magnetic pole pieces, and (ii) a second pair of magnetic pole pieces, mounted to at least one of the frame and the arm. The first pair of magnetic pole pieces are positioned within the opening with magnetic poles of like polarity oriented proximate to each other such that the first pair of movable magnetic pole pieces magnetically repel each other within the magnetic bearing compartment. The second pair of magnetic pole pieces are mounted with magnetic poles oriented such that the first pair of magnetic poles pieces are magnetically attracted to the second pair of magnetic pole pieces. The magnetic bearing compartment is mounted between the second pair of magnetic pole pieces, such that the first pair of magnetic pole pieces and the second pair of magnetic pole pieces magnetically attract each other to magnetically couple the frame to the arm.

In further related embodiments, the magnetic bearing compartment may be located on the frame, or may be located on the arm. The magnetic pole piece may be a sphere, or may be a hemisphere with a cylinder. The second pair of magnetic pole pieces may further comprise round surfaces. The two pairs of magnetic pole pieces may be convex and the other of the two pairs of magnetic pole pieces may be concave. The axis of magnetic attraction and repulsion may be parallel to the axis of rotation of the arm on the frame. A T-hinge structure may be mounted to at least one of the frame and the arm. The T-hinge structure may comprise a horizontal arm oriented perpendicular to the axis of rotation of the arm on the frame, and a vertical arm oriented parallel to the axis of rotation. The first pair of magnetic pole pieces may have a strength from about 0.001 tesla to about 0.01 tesla. The second pair of magnetic pole pieces may have a strength from about 0.001 tesla to about 0.01 tesla.

In another embodiment, a magnetic coupling system for eyewear comprises a frame of the eyewear, an arm of the eyewear and a hinge coupling the frame to the arm. The hinge comprises a rotatable coupling that rotates about an axis with respect to at least one of the frame and the arm. The rotatable coupling comprises a first magnetic pole piece comprising a magnetic axis oriented perpendicular to the axis of rotation of the rotatable coupling. The rotatable coupling also comprises a second magnetic pole piece mounted in a fixed position to at least one of the frame and the arm. The second magnetic pole piece comprises a magnetic polarity opposite to that of the first magnetic pole piece such that the first magnetic polepiece and the second magnetic pole piece magnetically attract each other to magnetically couple the frame to the arm.

In further related embodiments, the axis of magnetic attraction may be perpendicular to the axis of rotation of the arm on the frame. A hinge structure may be mounted to at least one of the frame and the arm, the hinge structure comprising a vertical arm oriented parallel to the axis of rotation of the arm on the frame. The first magnetic pole piece may have a strength of 0.001 tesla to 0.01 tesla. The second magnetic pole piece may have a strength of 0.001 tesla to 0.01 tesla.

Another embodiment comprises a magnetic coupling system for eyewear. The system comprises a frame of the eyewear; an arm of the eyewear; and a hinge coupling the frame to the arm. The hinge comprises a magnetic bearing compartment comprising: a) an opening; b) a pair of fixed magnetic pole pieces, the fixed pair of magnetic pole pieces being mounted in a fixed position within the opening; and c) a movable pair of magnetic pole pieces, movably mounted within the opening with magnetic poles oriented to be magnetically repulsed by the fixed pair of magnetic pole pieces such that the movable pair of magnetic poles pieces are urged into engagement with a pair of bearing pieces on at least one of the frame and the arm, thereby permitting rotation of the frame relative to the arm.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

An embodiment according to the invention operates just like a traditional eye-wear hinge with the added benefits of a magnetic connection. Using magnetic attraction and repulsion can function like traditional mechanical eyewear hinge, while also allowing the hinge to be easily de-coupled by separating magnetic pole pieces, thereby allowing frames and arms to be easily changed out and replaced. These magnetic style hinges can, for example, be used in prescription glasses, reading glasses, sports eye-wear, medical and dental protective eyewear, and eyewear used in aviation. The designs, according to an embodiment of the invention, allow for parts that can be easily replaced, making repairs easier and cheaper than traditional eyewear or than replacing a whole pair of glasses. Styles can also be changed to suit anyone's needs by simply changing out the eyewear arms with new ones.

No screws or small parts are required, making lost or broken parts easily replaceable at low cost. Small parts, such as screws would not be broken or lost during repairs due to the simplicity of this design. Styles can also be changed to suit the user's needs by simply changing out the eyewear arms with new ones. There can also be the benefit of allowing a user to connect the arm to the frame of eyewear more easily, as the direction of magnetic attraction can be the same direction the user brings the arm to the frame.

Figure 1:
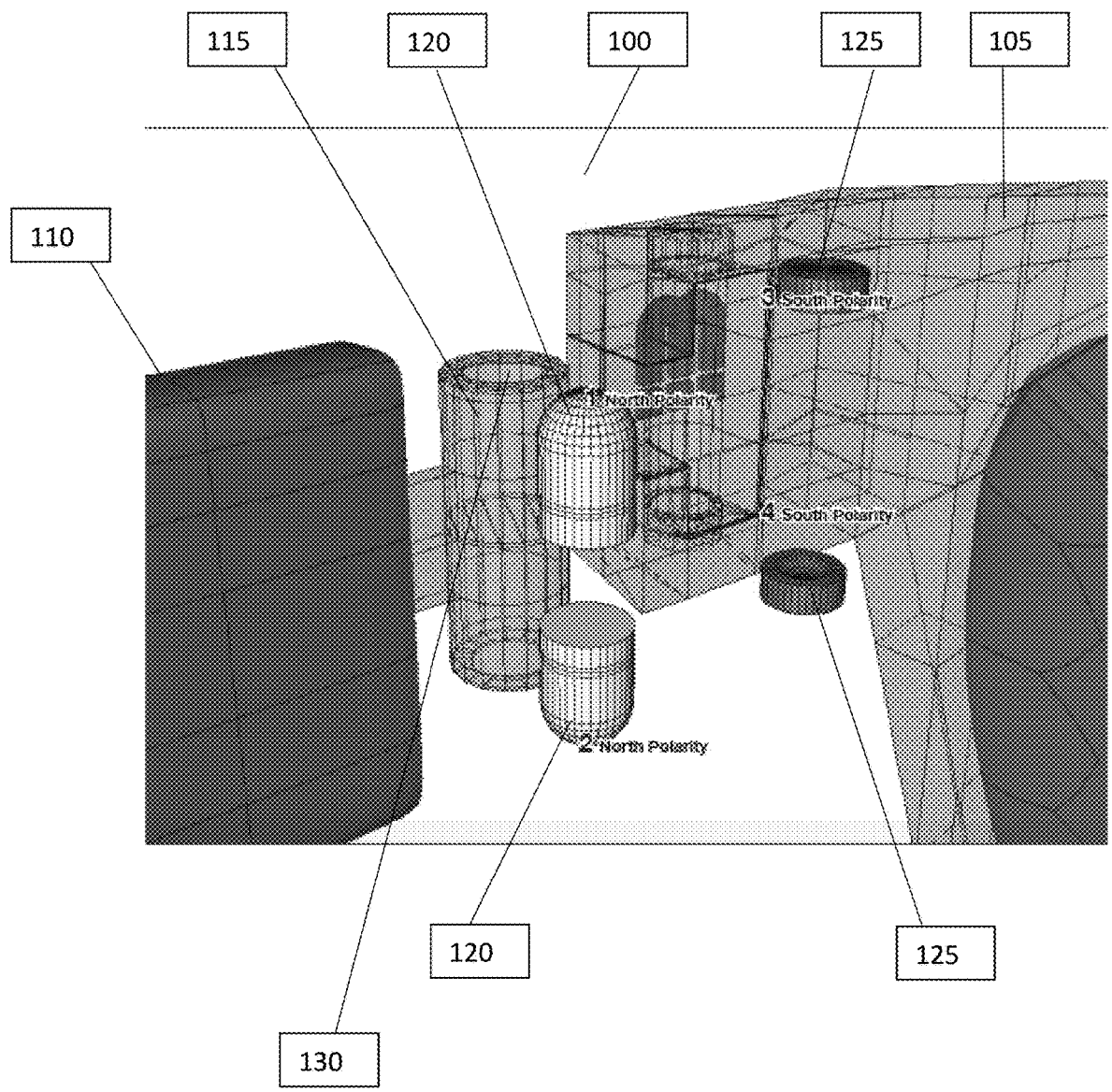
FIG. 1 is a schematic diagram of a magnetic eyewear coupling, in accordance with an embodiment of the invention.

FIG. 1 is a schematic diagram of a magnetic eyewear coupling 100, in accordance with an embodiment of the invention. The system 100 includes a frame 105 of the eyewear, an arm 110 of the eyewear, and a hinge 115 coupling the frame 105 to the arm 110. The hinge 115 comprises a rotatable coupling that rotates about an axis of rotation with respect to at least one of the frame 105 and the arm 110. The rotatable coupling comprises a first pair of magnetic pole pieces 120 comprising a magnetic axis oriented perpendicular to the axis of rotation of the rotatable coupling. A second pair of magnetic pole pieces 125 is mounted in a fixed position to at least one of the frame 105 and the arm 110. The second pair of magnetic pole pieces 125 comprises a magnetic polarity opposite to that of the first pair of magnetic pole pieces 120 such that the first pair of magnetic pole pieces 120 and the second pair of magnetic pole pieces 125 magnetically attract each other to magnetically couple the frame 105 to the arm 110.

An embodiment provides a magnetic coupling system for eyewear, the system comprising a frame of the eyewear, an arm of the eyewear, and a hinge coupling the frame to the arm. The hinge comprises (i) a magnetic bearing compartment comprising an opening, and a first pair of magnetic pole pieces and (ii) a second pair of magnetic pole pieces, mounted to at least one of the frame and the arm. The first pair of magnetic pole pieces are positioned within the opening with magnetic poles of like polarity oriented proximate to each other such that the first pair of movable magnetic pole pieces magnetically repel each other within the magnetic bearing compartment. The second pair of magnetic pole pieces are mounted with magnetic poles oriented such that the first pair of magnetic poles pieces are magnetically attracted to the second pair of magnetic pole pieces. The magnetic bearing compartment is mounted between the second pair of magnetic pole pieces, such that the first pair of magnetic pole pieces and the second pair of magnetic pole pieces magnetically attract each other to magnetically couple the frame to the arm.

In another embodiment, the magnetic pole piece may be a hemisphere with a cylinder. In yet another embodiment, the second pair of magnetic pole pieces further comprising round surfaces. In yet another embodiment, the two pairs of magnetic pole pieces may be convex and the other of the two pairs of magnetic pole pieces may be concave. In yet another embodiment, the axis of magnetic attraction and repulsion may be parallel to the axis of rotation of the arm on the frame. In yet another embodiment, a T-hinge structure may be mounted to at least one of the frame and the arm. The T-hinge structure comprises a horizontal arm oriented perpendicular to the axis of rotation of the arm on the frame, and a vertical arm oriented parallel to the axis of rotation. The first pair of magnetic pole pieces have a strength from about 0.001 tesla to about 0.01 tesla. The second pair of magnetic pole pieces have a strength from about 0.001 tesla to about 0.01 tesla.

Figure 2:
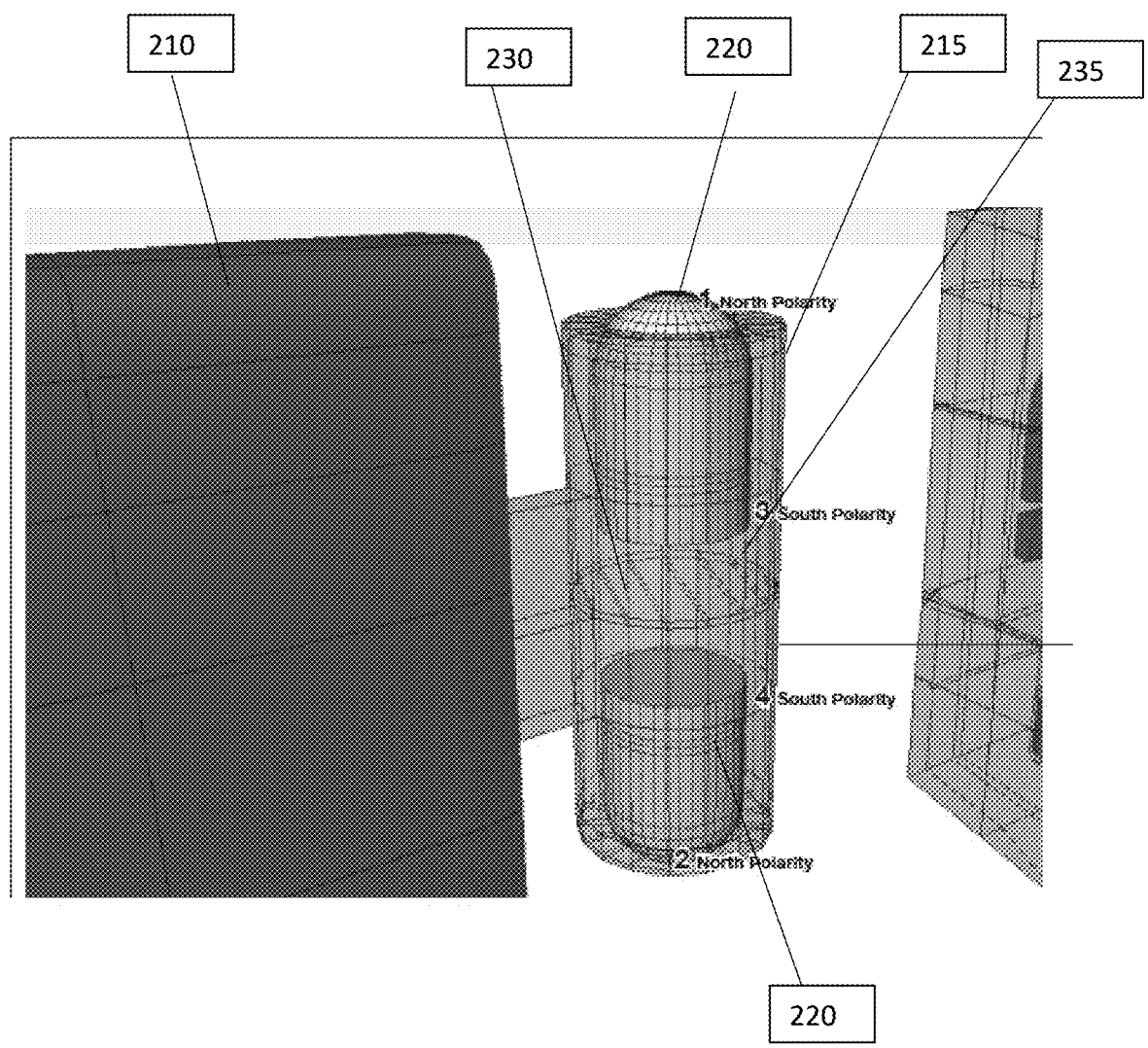
FIG. 2 is a schematic diagram of the assembled coupling of the embodiment of FIG. 1.

FIG. 2 is a schematic diagram of the assembled magnetic coupling system of the embodiment of FIG. 1. The first pair of magnetic pole pieces 220 are contained within an opening 235 in the magnetic bearing compartment 230. In an embodiment, the T-hinge 215, wherein the magnetic bearing compartment 230 is located, is coupled to the arm 210 of the eyewear. The T-hinge 215, according to an embodiment of the invention, is set up and positioned the same as traditional eyewear hinges. Functionality is the same as the traditional hinges, but with the added benefit of easily being able to change new arms with your frames, along with fewer smaller pieces that would easily be lost or broken. The T-hinge 215 is made of four separate magnets, two of which 120 (see FIG. 1), are at the end of the eyewear's arm, and the other two of which 125 are inside the frame. The magnets 120 in the arms connect to the surface of the frame magnets 125 with the attractive force of their opposing polarities. The natural repelling force of the same polarities of the magnets in the T-hinge 215 (see FIG. 2) adds extra security at the connecting point of the hinge and are kept in place by the end lip of the magnet bearing compartment 215 containing them.

Figure 3:
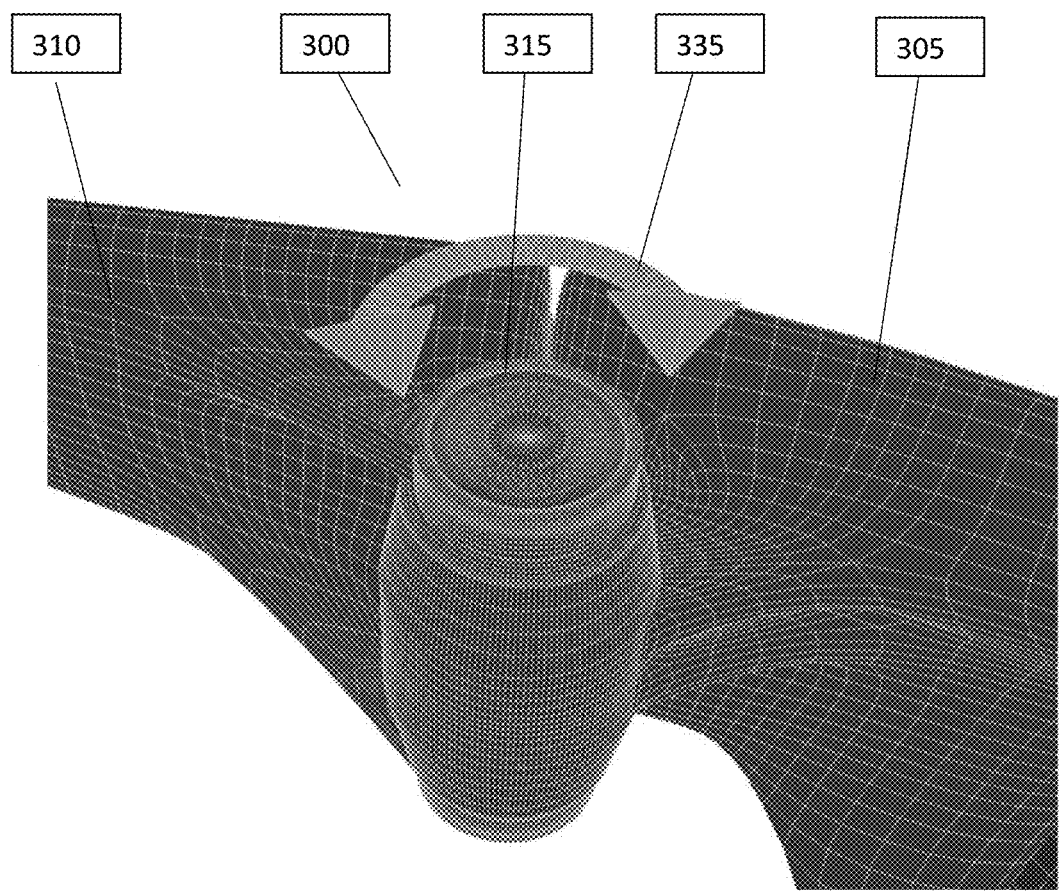
FIG. 3 is a schematic diagram of a magnetic coupling system using spherical magnets, in accordance with an embodiment of the invention.

FIG. 3 is a schematic diagram of an assembled magnetic coupling system 300 using spherical magnets, in accordance with an embodiment of the invention. The axis of magnetic attraction is perpendicular with respect to the axis of rotation 335 around the hinge 315 of the arm 310 with respect to the frame 305 of the eyewear.

Figure 4:
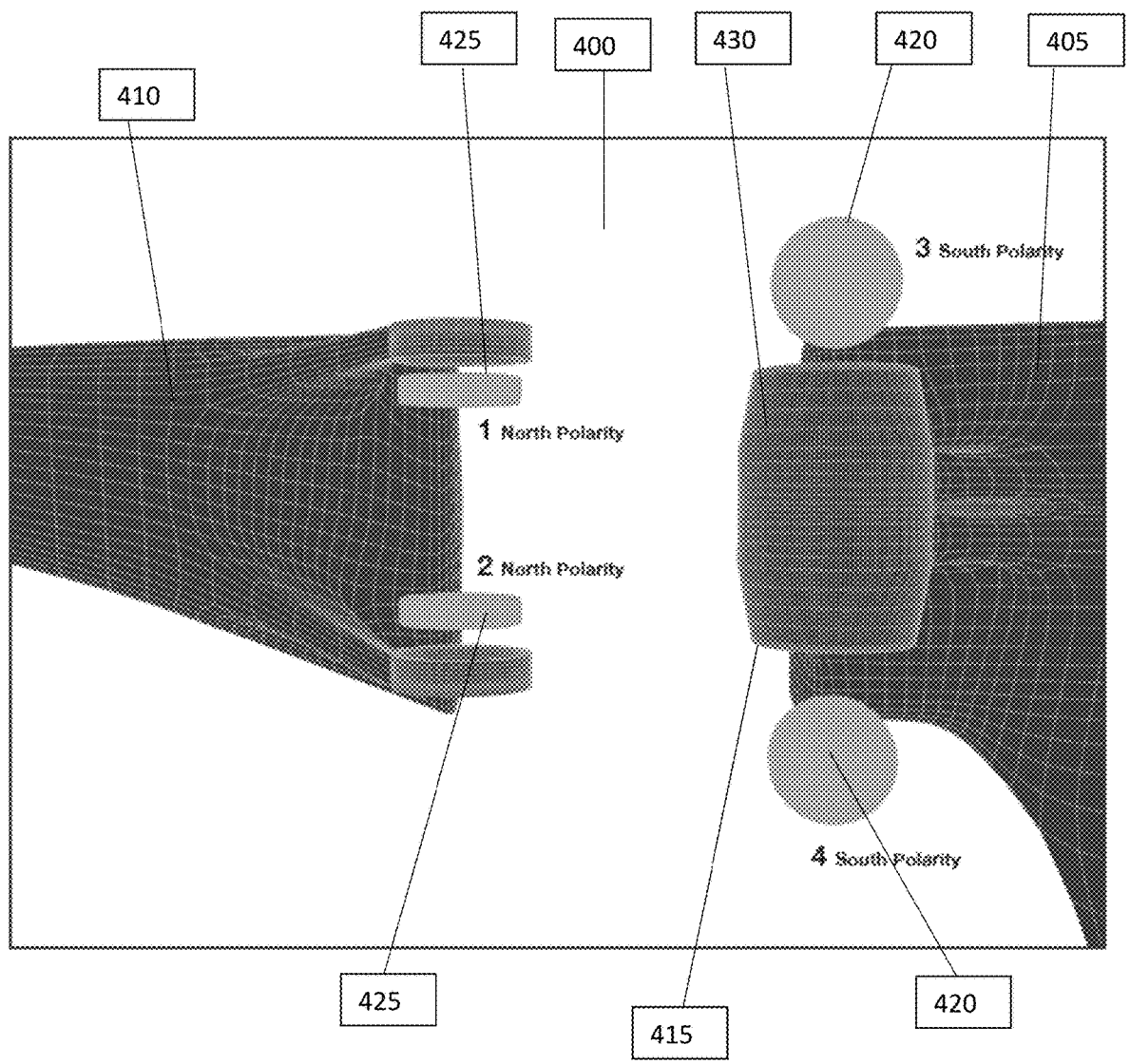
FIG. 4 is an exploded view schematic diagram of a magnetic coupling system using spherical magnets, in accordance with an embodiment of the invention.
Figure 5:
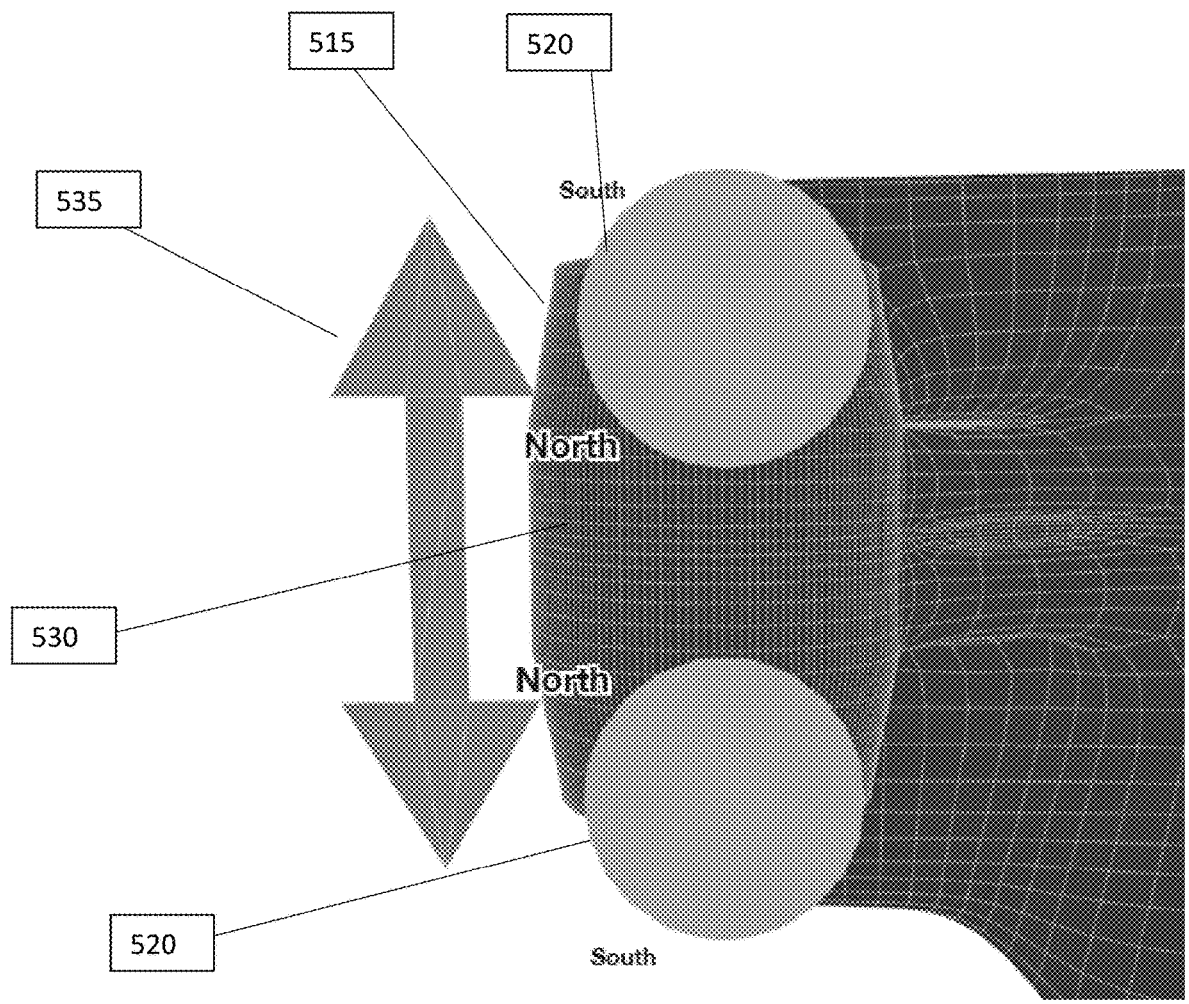
FIG. 5 is a schematic diagram of the magnetic field of the embodiment of FIG. 4.

In some embodiments, the magnetic bearing compartment may be located on the frame. In other embodiments, the magnetic bearing compartment may be located on the arm. In another embodiment, the magnetic pole piece may be a sphere. FIG. 4 is an exploded view schematic diagram of a magnetic coupling system 400 using a first pair of magnetic pole pieces 420 that are spherical, in accordance with an embodiment of the invention. The first pair of magnetic pole pieces 420 that are spherical are located within the magnetic bearing compartment 430, altogether comprising the T-hinge 415. The magnetic coupling system 400 further includes a frame of the eyewear 405, an arm of the eyewear 410, and a second pair of magnetic pole pieces 425. FIG. 5 is a schematic diagram of the magnetic field of the embodiment of FIG. 4. The first pair of magnetic pole pieces 520 are oriented vertically on top of one another within the magnetic bearing compartment 530 inside the T-hinge 515. That orientation of the first pair of magnetic pole pieces 520 causes the magnets to repel 535 each other and push each other to opposite ends of the magnetic bearing compartment 530.

Figure 6A:
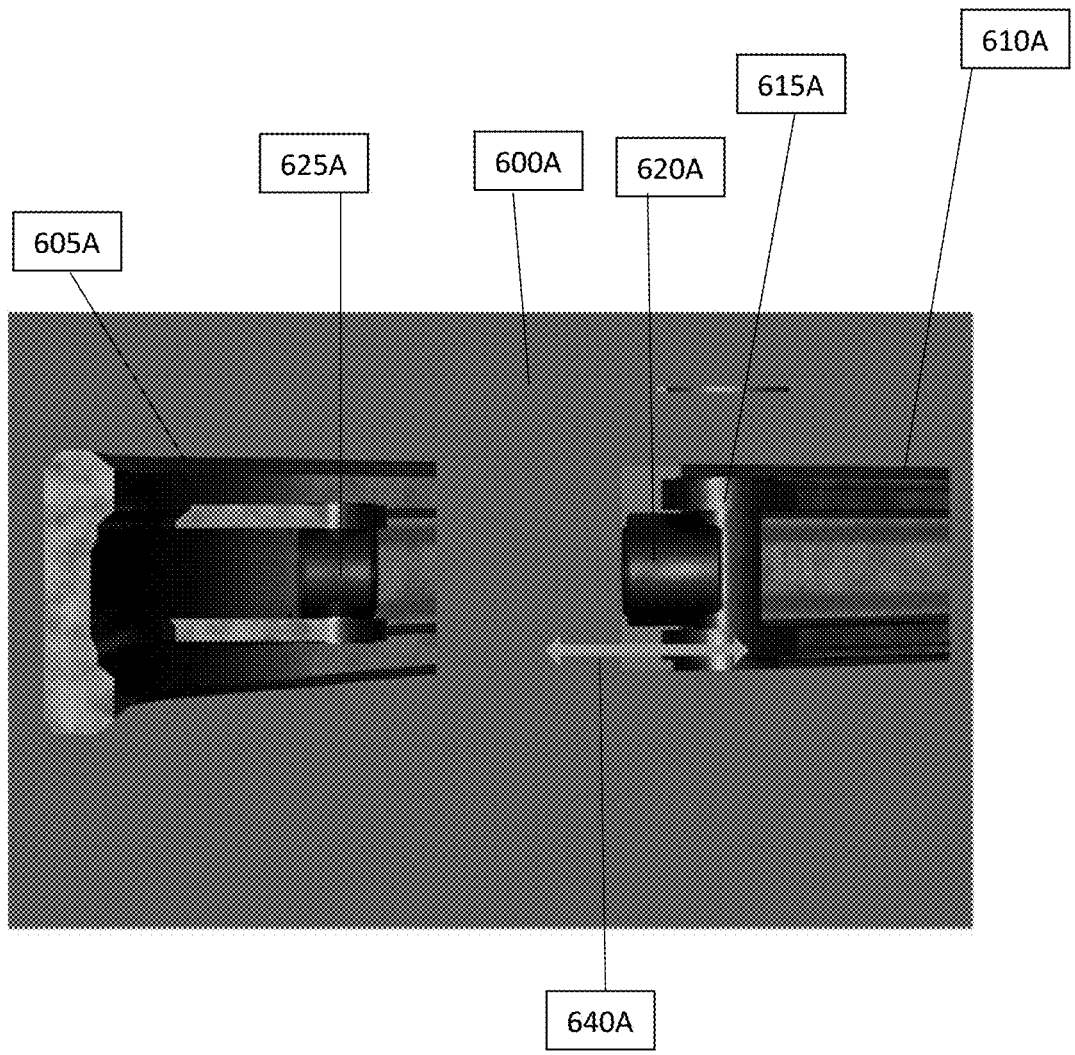
FIG. 6A is a schematic diagram of a magnetic coupling system using a horizontal magnetic axis of attraction and repulsion, in accordance with an embodiment of the invention
Figure 6B:
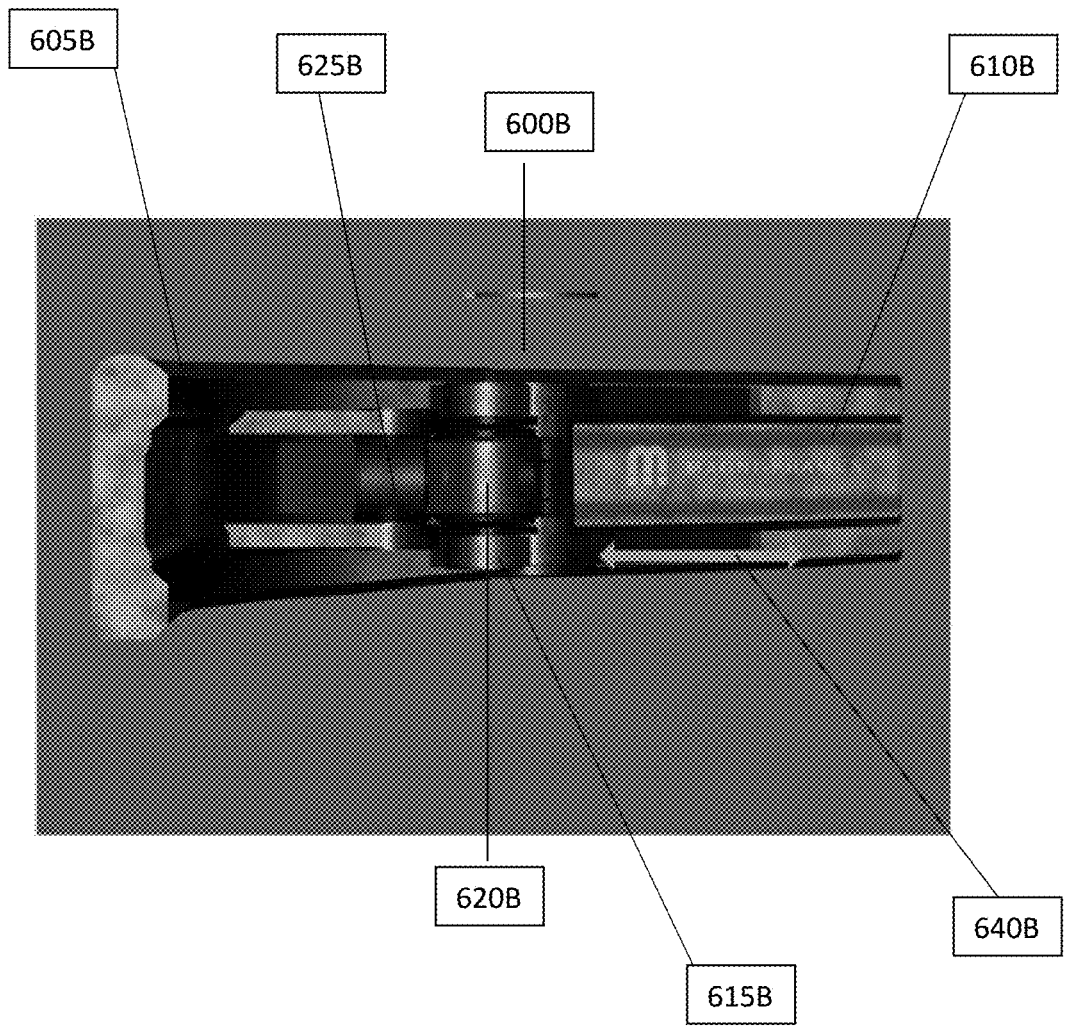
FIG. 6B is a schematic diagram of the assembled coupling of the embodiment of FIG. 6A.

In another embodiment, shown in FIGS. 6A and 6B, a magnetic coupling system for eyewear comprises a frame of the eyewear, an arm of the eyewear and a hinge coupling the frame to the arm. The hinge comprises a rotatable coupling that rotates about an axis with respect to at least one of the frame and the arm. The rotatable coupling comprises a first magnetic pole piece comprising a magnetic axis oriented perpendicular to the axis of rotation of the rotatable coupling. The rotatable coupling also comprises a second magnetic pole piece mounted in a fixed position to at least one of the frame and the arm. The second magnetic pole piece comprises a magnetic polarity opposite to that of the first magnetic pole piece such that the first magnetic polepiece and the second magnetic pole piece magnetically attract each other to magnetically couple the frame to the arm.

FIG. 6A is a schematic diagram of a magnetic coupling system 600A using a horizontal magnetic axis of attraction and repulsion, in accordance with an embodiment of the invention. The second magnetic pole piece 625A is located on the frame 605A. The first magnetic pole piece 620A is located on the frame 610A. The axis of magnetic attraction 640A is parallel to the axis of rotation of the arm 610A with respect to the frame 605A. The arm 610A is coupled to the hinge 615A of the eyewear.

FIG. 6B is a schematic diagram of the assembled magnetic coupling system 600B of the embodiment of FIG. 6A. The second magnetic pole piece 625B is located on the frame 605B. The first magnetic pole piece 620B and the hinge 615B are located on the arm 610B of the eyewear. Once assembled, the axis of rotation of the arm 610B with respect to the frame 605B is parallel to the axis of magnetic attraction 640B.

In some embodiments, the axis of magnetic attraction may be perpendicular to the axis of rotation of the arm on the frame. In other embodiments, a hinge structure may be mounted to at least one of the frame and the arm, the hinge structure comprising a vertical arm oriented parallel to the axis of rotation of the arm on the frame. The first magnetic pole piece may have a strength of 0.001 tesla to 0.01 tesla. The second magnetic pole piece may have a strength of 0.001 tesla to 0.01 tesla.

Figure 7:
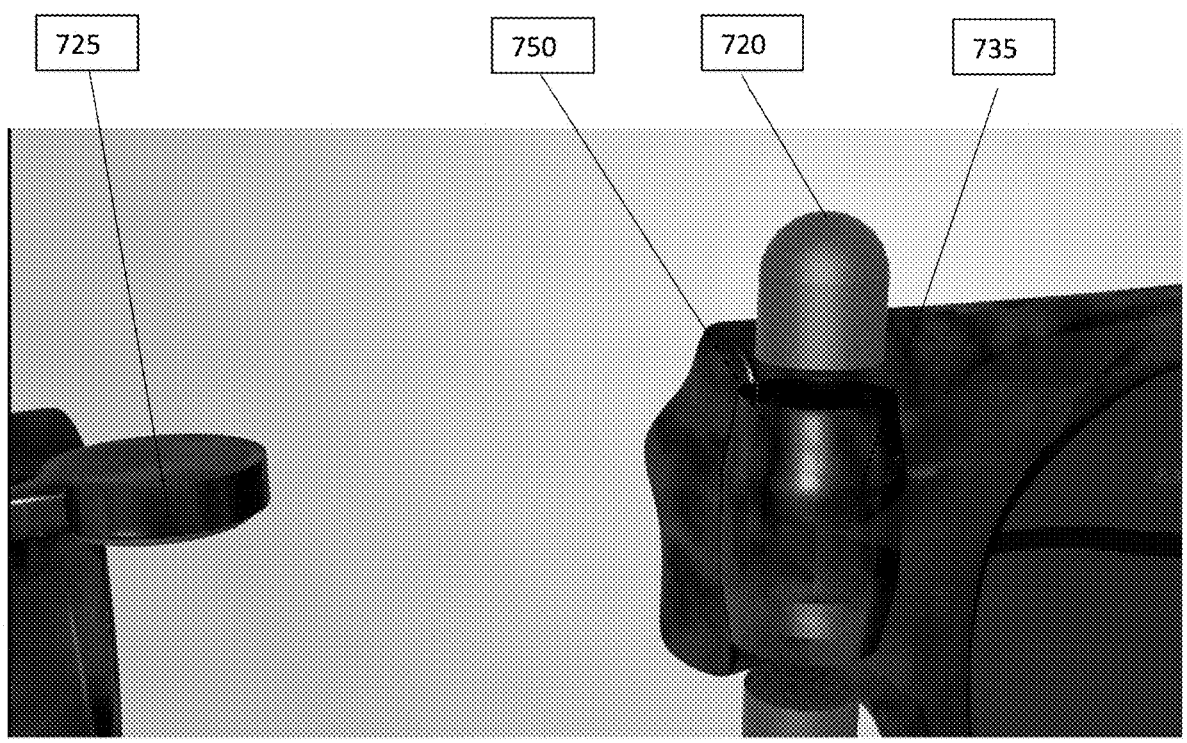
FIG. 7 is a schematic diagram of a further magnetic coupling system, in accordance with an embodiment of the invention, in which an additional set of magnetic pole pieces is mounted inside the opening of the magnetic bearing compartment, which produces a magnetic repulsion of the movable magnetic pole pieces against corresponding bearing pieces.

In a further embodiment, shown in FIG. 7, a structure is used in which an additional set of magnetic pole pieces 750 is mounted inside the opening of the magnetic bearing compartment, which produces a magnetic repulsion of the movable magnetic pole pieces 720 against corresponding bearing pieces 725. Thus, for example, magnetic pole piece 750 may be mounted in a fixed position relative to the opening 735 of the magnetic bearing compartment, with its south magnetic pole facing upwards in FIG. 7, while the south magnetic pole of the movable magnetic pole piece 720 is oriented downwards in FIG. 7. This produces a magnetic repulsion which tends to urge the movable pole piece 720 upwards, thereby urging the pole piece 720 upwards into engagement with a bearing piece 725 mounted on the arm. The movable pole piece 720 can, in one example, be held from falling out of the magnetic bearing compartment by narrowing features at the top of the opening 735 of the magnetic bearing compartment. It will be appreciated that a similar arrangement to that shown in FIG. 7 can be used with the magnetic bearing compartment being on the arm, while the bearing piece 725 is on the frame. The bearing piece 725 can be either an additional magnet, which attracts the magnetic pole piece 720, or a non-magnetic bearing surface against which the movable pole piece 720 engages and can rotate. Corresponding features can be on the top and bottom of the hinge. Other features of the embodiment of FIG. 7 can be similar to that of the embodiments of FIGS. 1-5.

The design according to an embodiment of the invention improves upon the current mechanism used in all everyday eyewear using the natural power of magnetic attraction and repulsion. Using an embodiment to the invention can, for example, permit frames to be changed out easily, for a variety of different purposes. For example, in addition to permitting easy maintenance and repair of eyewear, the magnetic coupling can permit designs of different fashion to be worn on different days; permit re-use of eyewear for personal protection in the healthcare setting; provide eyewear materials of different thermal properties in different weather and climate' and permit logos, brands, sports team insignia, and other images and displays to be provided and easily changed on the eyewear on different occasions.

While example embodiments have been particularly shown and described, it will be understood by those skilled in the art that various changes in form and details may be made therein without departing from the scope of the embodiments encompassed by the appended claims.

What is claimed is:

1. A magnetic coupling system for eyewear, the system comprising:
   a frame of the eyewear
   an arm of the eyewear; and
   a hinge coupling the frame to the arm, the hinge comprising (i) a magnetic bearing compartment comprising:
   a) an opening;
   b) a first pair of magnetic pole pieces contained within the magnetic bearing compartment, the first pair of magnetic pole pieces being positioned within the opening with magnetic poles of like polarity oriented proximate to each other such that the first pair of magnetic pole pieces magnetically repel each other within the magnetic bearing compartment, the first pair of magnetic pole pieces being kept within the magnetic bearing compartment by a pair of end lips of the magnetic bearing compartment;

(ii) a second pair of magnetic pole pieces, mounted to at least one of the frame and the arm, the second pair of magnetic pole pieces being mounted with magnetic poles oriented such that the first pair of magnetic poles pieces are magnetically attracted to the second pair of magnetic pole pieces by mounting of the magnetic bearing compartment between the second pair of magnetic pole pieces, such that the first pair of magnetic pole pieces and the second pair of magnetic pole pieces magnetically attract each other to magnetically couple the frame to the arm; and wherein a T-hinge structure is mounted to at least one of the frame and the arm, the T-hinge structure comprising a horizontal arm oriented perpendicular to the axis of rotation of the arm on the frame, and a vertical arm oriented parallel to the axis of rotation; and the first pair of magnetic pole pieces being contained within an opening in the vertical arm of the T-hinge structure.

2. The magnetic coupling system of claim 1, wherein the magnetic bearing compartment is located on the frame.

3. The magnetic coupling system of claim 1, wherein the magnetic bearing compartment is located on the arm.

4. The magnetic coupling system of claim 1, wherein at least one of the magnetic pole pieces is a sphere.

5. The magnetic coupling system of claim 1, wherein at least one of the magnetic pole pieces is a hemisphere with a cylinder.

6. The magnetic coupling system of claim 1, the second pair of magnetic pole pieces further comprising round surfaces.

7. The magnetic coupling system of claim 1, wherein one of the two pairs of magnetic pole pieces is convex and the other of the two pairs of magnetic pole pieces is concave.

8. The magnetic coupling system of claim 1, wherein the axis of magnetic attraction and repulsion is parallel to the axis of rotation of the arm on the frame.

9. The magnetic coupling system of claim 1, wherein the first pair of magnetic pole pieces have a strength of from about 0.001 tesla to about 0.01 tesla.

10. The magnetic coupling system of claim 1, wherein the second pair of magnetic pole pieces have a strength of from about 0.001 tesla to about 0.01 tesla.

* * * * *